United States Patent [19]

Kojima

[11] Patent Number: 5,953,484
[45] Date of Patent: *Sep. 14, 1999

[54] VIDEO TRANSMITTING APPARATUS, VIDEO DATA RECEIVING APPARATUS, AND VIDEO DATA TRANSMITTING AND RECEIVING SYSTEM

[75] Inventor: Yuichi Kojima, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/605,614

[22] Filed: Feb. 22, 1996

[30] Foreign Application Priority Data

Feb. 24, 1995 [JP] Japan ..................................... 7-037371

[51] Int. Cl.⁶ .................................................. H04N 5/783
[52] U.S. Cl. .............................................. 386/68; 386/112
[58] Field of Search ............................ 386/46, 109, 112, 386/124, 68, 67, 52, 65, 45; 348/6, 7, 12, 13; H04N 5/76, 5/783, 5/92

[56] References Cited

U.S. PATENT DOCUMENTS

| | | | |
|---|---|---|---|
| 4,489,351 | 12/1984 | d'Alayer de Costemore D'Arc | 358/906 |
| 4,963,995 | 10/1990 | Lang | 386/54 |
| 5,065,259 | 11/1991 | Kubota et al. | 386/7 |
| 5,287,224 | 2/1994 | Tsuchia et al. | 386/65 |
| 5,434,673 | 7/1995 | Inoue et al. | 386/95 |

*Primary Examiner*—Huy Nguyen
*Attorney, Agent, or Firm*—Frommer Lawrence & Haug, LLP.; William S. Frommer

[57] ABSTRACT

A video data transmitting and receiving system which compresses an amount of information of a video signal at a compression rate in accordance with a transmission mode, directly modulates the video signal after compression in accordance with the transmission mode or once records the video signal by a recording and reproducing apparatus and then reproduces the same with a different rate from that at the recording, detects the transmission mode at a reception side, directly decodes this in accordance with the detected transmission mode or once records the same, reproduces this at a different rate from that at the recording and then decodes the resultant data.

10 Claims, 4 Drawing Sheets

VIDEO TRANSMITTING APPARATUS, VIDEO DATA RECEIVING APPARATUS, AND VIDEO DATA TRANSMITTING AND RECEIVING SYSTEM

BACKGROUND OF THE INVENTION

1. Field of the Invention

The present invention relates to a video data transmitting apparatus and a video data receiving apparatus used for the transmission of compressed and encoded video data and to a video data transmitting and receiving system using the same.

2. Description of the Related Art

In a video signal transmitting and receiving system for conveying a video signal from a news site to a broadcasting station via a satellite communication line, for example, the video signal is subjected to analog frequency modulation and transmitted at the signal speed, that is, the real time speed, of the video signal at the time of filming as is.

Since the video signal transmitting apparatus and the video signal receiving apparatus do not allow a video recorded using a single-unit video camera-recorder, that is, a camcorder, etc. at the news site to be transmitted at a higher speed, it is often not possible to secure sufficient time for editing the video before broadcasting.

Some apparatuses are therefore designed to transmit the video signal at a higher speed. However, this is costly and it is not always necessary to transmit the signal at a higher speed to allow editing, such as when covering a live sports event.

SUMMARY OF THE INVENTION

An object of the present invention is to provide a video data transmitting apparatus, a video data receiving apparatus, and a video data transmitting and receiving system which can transmit a video signal at a compression rate and in a transmission time optimal for the quality of the video signal required in the transmission time required.

So as to realize the above object, the present invention provides, as a first aspect, a video data transmitting apparatus including a control means for outputting a control signal indicating a transmission mode of a video signal; a compression means for receiving as its input the video signal and compressing an amount of information of the video signal at a compression rate in accordance with the transmission mode indicated by the control signal; a recording and reproducing means for selectively recording the video signal subjected to the compression processing by the compression means in accordance with the transmission mode and reproducing the recorded video signal at a predetermined rate; a selection means for selecting an output video signal of the compression means or the output video signal of the recording and reproducing means in accordance with the transmission mode indicated by the control signal and outputting the selected output video signal; and a transmission means for modulating the output video signal supplied from the selection means and transmitting the resultant signal.

According to another aspect of the invention, there is provided a video data receiving apparatus including a reception means for receiving a compressed digital video signal including a transmission mode; a detection means for detecting the transmission mode of the signal received at the reception means; a recording and reproducing means for selectively recording the signal received by the reception means in accordance with the transmission mode detected by the detection means and reproducing the recorded video signal at a rate in accordance with the detected transmission mode; a selection means for selecting the output signal of the reception means or the output signal of the recording and reproducing means in accordance with the detected transmission mode and outputting the selected signal; and a decompression means for decompressing the signal output from the selection means.

According to still another aspect of the invention, there is provided a video data transmitting and receiving system including a control means for outputting a control signal indicating a transmission mode of a video signal; a compression means for receiving as its input the video signal and compressing the amount of information of the video signal at a compression rate in accordance with the transmission mode indicated by the control signal; a first recording and reproducing means for selectively recording the video signal subjected to the compression processing by the compression means in accordance with the transmission mode and reproducing the recorded video signal at a predetermined rate; a selection means for selecting an output video signal of the compression means or the output video signal of the first recording and reproducing means in accordance with the transmission mode indicated by the control signal and outputting the selected output video signal; a transmission means for transmitting the output video signal supplied from the first selection means to a transmission line; a reception means for receiving the transmitted signal from the transmission line; a detection means for detecting the transmission mode of the signal received at the reception means; a second recording and reproducing means for selectively recording the signal received by the reception means in accordance with the transmission mode detected by the detection means and reproducing the recorded video signal at a rate in accordance with the detected transmission mode; a second selection means for selecting the output signal of the reception means or the output signal of the second recording and reproducing means in accordance with the detected transmission mode and outputting the selected signal; and a decompression means for decompressing the signal output from the second selection means.

BRIEF DESCRIPTION OF THE DRAWINGS

These and other objects and features of the present invention will become more apparent from the following description of the related art and preferred embodiments of the invention made with reference to the attached drawings, wherein.

DESCRIPTION OF THE PREFERRED EMBODIMENTS

Before describing the preferred embodiments, a more detailed explanation will be given of the related art with reference to the drawings as background information.

Figure 1:
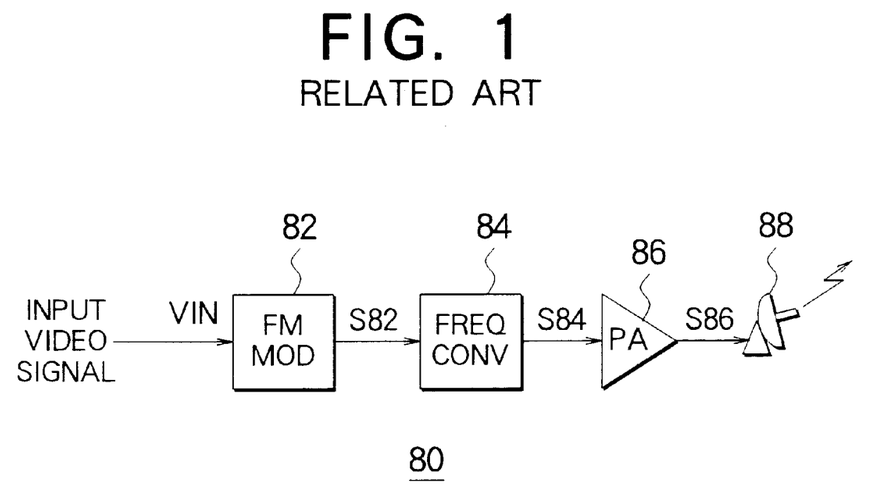
FIG. 1 is a block diagram of an example of a video signal transmitting apparatus of the related art.

As shown in FIG. 1, a video signal transmitting apparatus 80 of the related art frequency-modulates an input video signal VIN input from the outside to obtain a modulated signal S82 of an intermediate frequency band, converts the same to a transmission signal S84 of a frequency suitable for a satellite communication line by a frequency conversion circuit (up converter) 84, amplifies the power by a power amplification circuit 86, and transmits the resultant signal via a transmission antenna 88.

Figure 2:
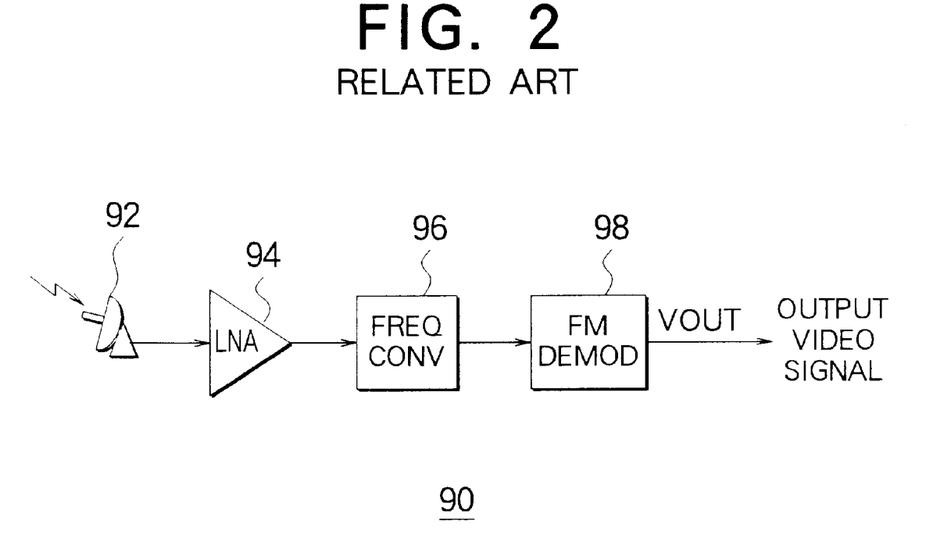
FIG. 2 is a block diagram of an example of a video signal receiving apparatus of the related art.

As shown in FIG. 2, a video signal receiving apparatus 90 receives the signal transmitted from the satellite communication line via a reception antenna 92, amplifies the same by a low noise amplification circuit 94, converts this to an intermediate frequency band by a frequency conversion circuit (down converter) 96, demodulates the same by an FM demodulation circuit 98, and outputs the resultant signal as an output video signal VOUT corresponding to the original input video signal VIN.

The video signal transmitting apparatus 80 and the video signal receiving apparatus 90 transmit and receive the video signal in real time, so do not allow a video recorded using a camcorder etc. at the news site to be transmitted at a higher speed. Therefore, as mentioned above, it is often not possible to secure sufficient time for editing the video before broadcasting. As mentioned earlier, as well, some apparatuses are designed to transmit and receive the video signal at a higher speed. However, this is costly and it is not always necessary to transmit the signal at a higher speed to allow editing, such as when covering a live sports event.

Figure 3:
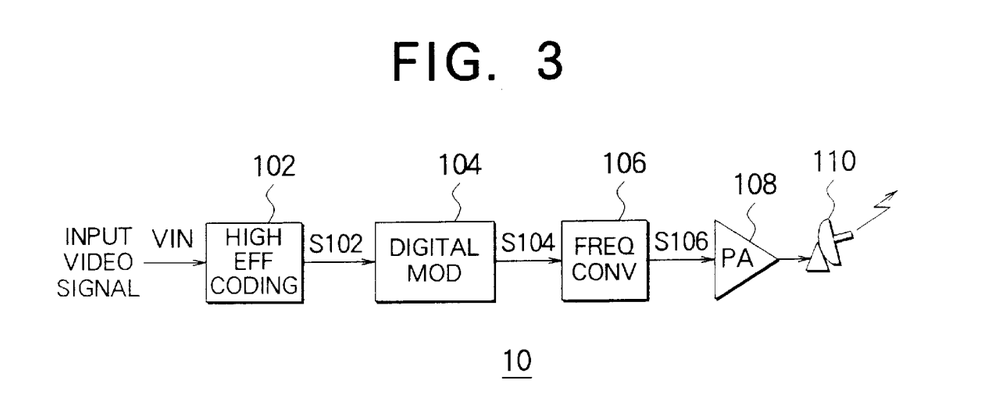
FIG. 3 is a block diagram of an example of a video data transmitting apparatus using high efficient coding.

FIG. 3 is a block diagram of an example of the configuration of a video data transmitting apparatus 10 using a high efficient coding circuit.

Figure 4:
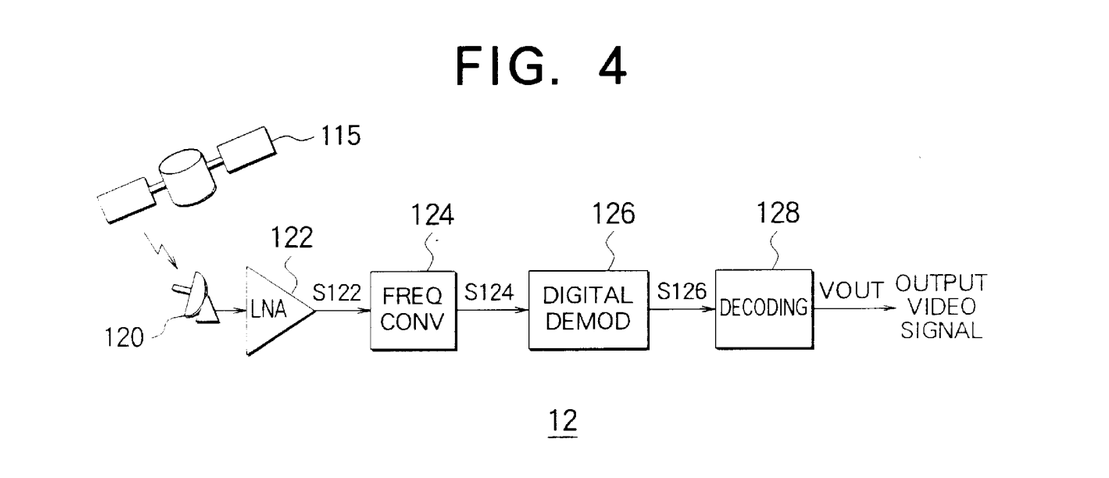
FIG. 4 is a block diagram of an example of a video data receiving apparatus using a decoder.

FIG. 4 is a block diagram of the configuration of a video data receiving apparatus 12 corresponding to the video data transmitting apparatus of FIG. 3.

As shown in FIG. 3, the video data transmitting apparatus 10 is constituted by a high efficient coding device 102, a digital modulation circuit 104, a frequency conversion circuit 106, a power amplification circuit (PA) 108, and a transmission antenna 110, performs high efficient coding on the input video data VIN of a digital format to generate a transmission signal, and transmits this transmission signal over the satellite communication line. As this high efficient coding, interframe differential discrete cosine transformation (DCT) coding accompanied by movement compensation is used. As one example, MPEG2 coding is used.

As shown in FIG. 4, the video data receiving apparatus 12 is constituted by a reception antenna 120, a low noise amplification circuit (LNA) 122, a frequency conversion circuit 124, a digital demodulation circuit 126, and a decoding circuit 128, receives the signal transmitted by the video data transmitting apparatus 10 via the satellite communication line using a communication satellite 115, decodes it to generate an output video data VOUT corresponding to the original input video data VIN, and supplies this output video data VOUT to a video editing device, recording device, etc. connected to the video data receiving apparatus 12.

Below, the operation of the video data transmitting apparatus 10 and the video data receiving apparatus 12 will be explained.

The input video data VIN input to the video data transmitting apparatus 10 is subjected to high efficient coding by the high efficient coding device 102 and is output as a coded video data S102 to the digital modulation circuit 104.

The digital modulation circuit 104 digitally modulates the coded video data S102 and outputs the same as a modulated signal S104 of the intermediate frequency band to the frequency conversion circuit 106. As this digital modulation, for example, quadrature phase shift keying (PSK) is used.

The frequency conversion circuit (up converter) 106 converts the modulated signal S104 to a frequency suited to the satellite communication line, for example, 12 GHz to 14 GHz, and outputs the resultant signal as a transmission signal S106 to the power amplification circuit 108.

The power amplification circuit 108 amplifies the power of the transmission signal S106 to a predetermined transmission output and transmits the same via a transmission antenna 110 to the satellite communication line.

The signal transmitted by the video data transmitting apparatus 10 is transmitted to the video data receiving apparatus 12 via the communication satellite 115.

The low noise amplification circuit 122 of the video data receiving apparatus 12 amplifies the transmission signal from the video data transmitting apparatus 10 received via the reception antenna 120 and outputs the same as a reception signal S122 to the frequency conversion circuit 124.

The frequency conversion circuit (down converter) 124 converts the reception signal to the reception signal S124 of the intermediate frequency band and outputs the result to the digital demodulation circuit 126.

The digital demodulation circuit 126 demodulates the reception signal 124 by a method corresponding to the digital modulation circuit 104 of the video data transmitting apparatus 10 to generate a demodulated signal S126 and outputs the same to the decoding circuit 128.

The decoding circuit 128 decodes the demodulated signal S126 and supplies the result as the output video data VOUT corresponding to the original input video data VIN to an outside apparatus.

By using a video data transmitting and receiving system using the video data transmitting apparatus 10 and the video data receiving apparatus 12 explained above, the video data can be transmitted by utilizing a satellite communication line.

In a video data transmitting and receiving system using the video data transmitting apparatus 10 (FIG. 3) and the video data receiving apparatus 12 (FIG. 4) shown in FIG. 3 and FIG. 4, due to the limitations of the operating speed of the high efficient coding device 102 of the video data transmitting apparatus 10 and the decoding circuit 128 of the video data receiving apparatus 12 performing the coding and decoding of the video data of the high sampling frequency used for broadcasting, the transmission signal can be transmitted only at a data speed (real time data speed) giving a video of the same speed as that of the original video data after decoding. It is therefore difficult to transmit compressed video data already recorded by the recording and reproducing apparatus at the news site to a broadcasting station in a short time.

Further, in the video data transmitting and receiving system using the video data transmitting apparatus 10 and the video data receiving apparatus 12, the compression rate of the high efficient coding is determined according to the band width of the satellite communication line which can be used for the transmission of the signal. Accordingly, where video data which is not suited to high compression rate coding is coded and transmitted at a high compression rate in accordance with the band width of the satellite communication line, there arises a problem that the quality of the video after decoding is deteriorated etc.

Further, where the video data is edited after decoding, there is further added the deterioration of the image quality accompanying the editing, so there is a demand that the video data be transmitted from the site by a method giving a high quality video after decoding. By the transmission of video data at a real time data speed using the video data transmitting apparatus 10 and the video data receiving apparatus 12, however, this demand cannot be met due to the limitations of the frequency band of the satellite communication line.

Figure 5:
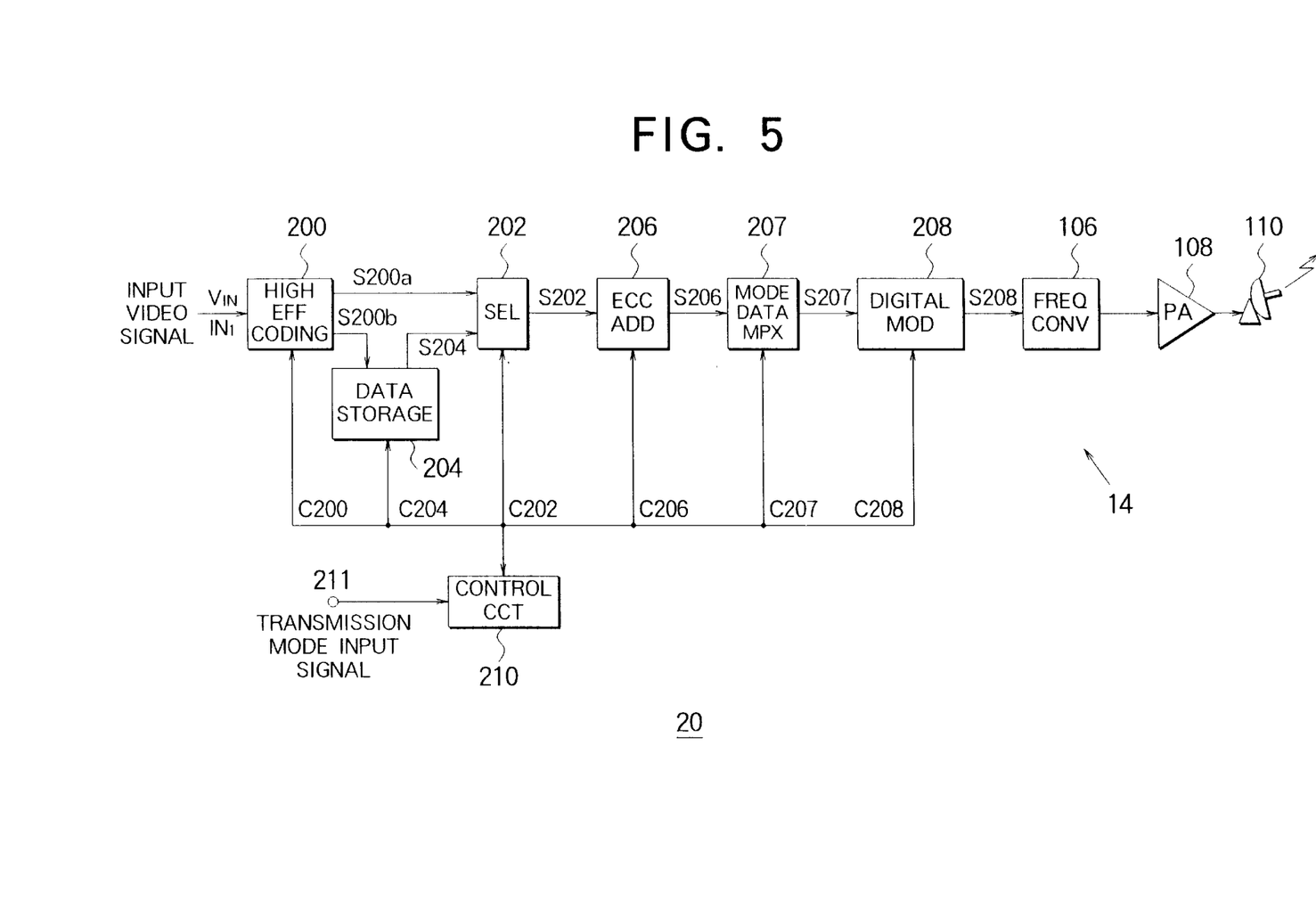
FIG. 5 is a block diagram of a video data transmitting apparatus according to an embodiment of the present invention.
Figure 6:
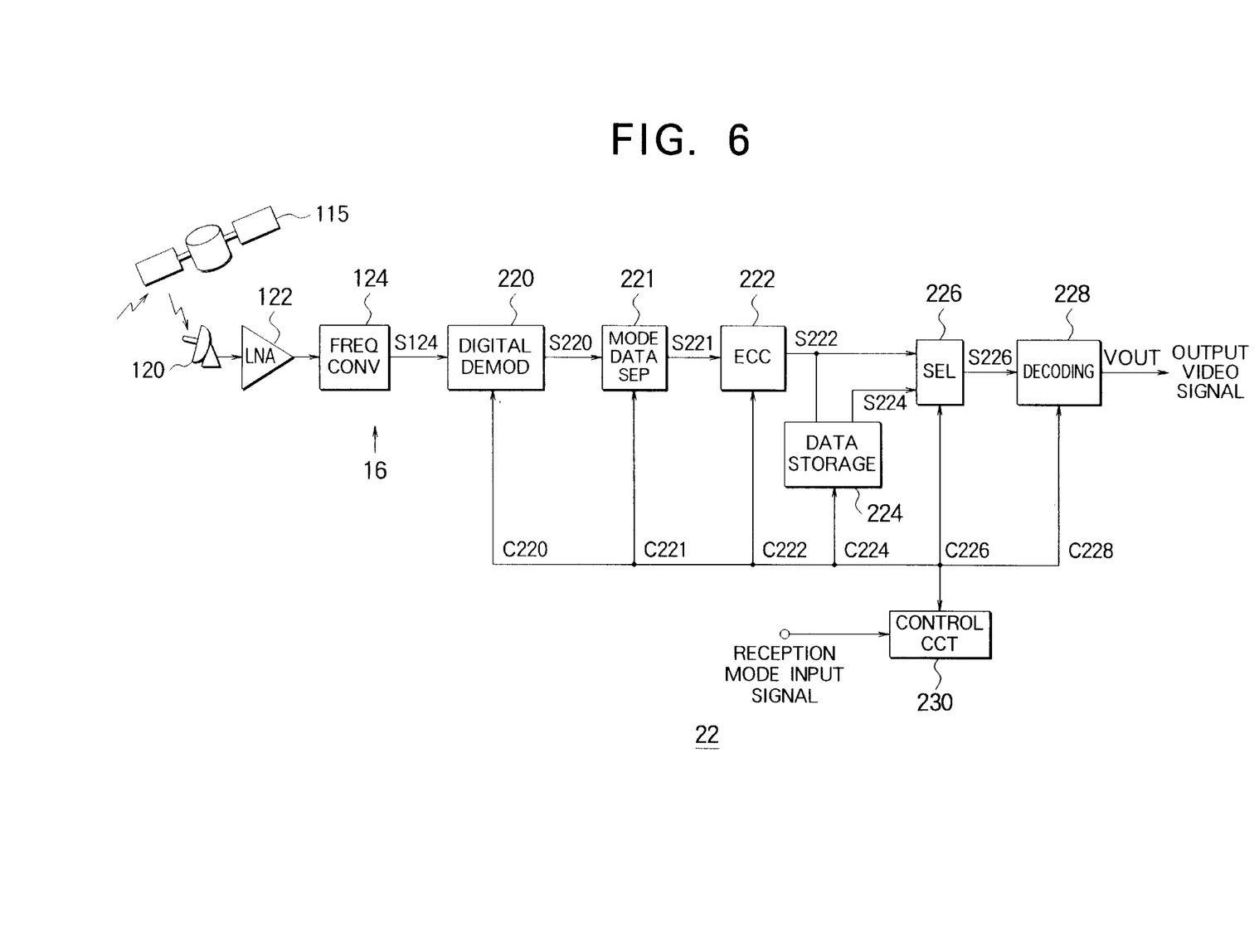
FIG. 6 is a block diagram of a video data receiving apparatus of an embodiment of the present invention.

A video data transmitting and receiving system using the video data transmitting apparatus 20 and the video data receiving apparatus 22 shown below solves the problem of the video data transmitting and receiving system constituted by the video data transmitting apparatus 10 and the video data receiving apparatus 12 and meets the above demand.

Note that constituent parts of the video data transmitting apparatus 20 shown in FIG. 5 corresponding to constituent parts of the video data transmitting apparatus 10 shown in FIG. 3 are given the same references and that constituent parts of the video data receiving apparatus 22 shown in FIG. 6 corresponding to constituent parts of the video data receiving apparatus 12 shown in FIG. 4 are given the same references.

As shown in FIG. 5, the video data transmitting apparatus 20 is constituted by a high efficient coding device 200, a data selection circuit (SEL) 202, a data storage device 204, an error correction code addition circuit 206, a digital modulation circuit 208, a control circuit 210, and a transmitting apparatus 14. The transmitting apparatus 14 is constituted by a frequency conversion circuit 106, a power amplification circuit 108, and a transmission antenna 110. This video data transmitting apparatus 20 performs high efficient coding for the input video data VIN, which is then transmitted by a method in accordance with the object and purpose thereof, to generate a transmission signal and transmits the same onto the satellite communication line.

As shown in FIG. 6, the video data receiving apparatus 22 is constituted by a reception apparatus 16, a digital demodulation circuit 220, an error correction circuit 222, a data storage device 224, a data selection circuit (SEL) 226, a decoding device 228, and a control circuit 230. The reception apparatus 16 is constituted by a reception antenna 120, a low noise amplification circuit 122, and a frequency conversion circuit 124, receives the transmission signal sent from the video data transmitting apparatus 20 via the satellite communication line, demodulates the transmission signal by a method in accordance with the transmission speed and the compression rate thereof, decodes this, and supplies the output video data VOUT corresponding to the original input video data VIN to a video editing device or other outside apparatus.

The high efficient coding device 200 of the video data transmitting apparatus 20 changes the compression rate according to control via a control signal C200 of the control circuit 210 in accordance with the object and purpose of the input video data VIN, compresses and codes the input video data VIN, and outputs the same as the compressed video data S200a and S200b to the data selection circuit 202 and the data storage device 204, respectively. As this high efficient coding device 200, an interframe differential discrete cosine transformation coding circuit accompanied by movement compensation is used. As one example, an MPEG2 coding circuit is used.

The data storage device 204 records the compressed video data S200b input from the high efficient coding device 200 under the control of the control circuit 210 via a control signal C204 in a recording medium such as for example a magneto-optic disc, hard disc, etc. Further, the data storage device 204 reproduces the recorded video signal at a different transmission speed from the real time data speed under the control of the control circuit 210 and outputs the same as the compressed video data S204 to the data selection circuit 202.

The data selection circuit 202 selects either of the input compressed video data S200a or S204 according to the control of the control circuit 210 via a control signal C202 (switching signal) and outputs the same as the compressed video data S202 (selection signal) to the error correction code addition circuit 206. More specifically, for example, where the input video data VIN is not to be edited, the data selection circuit 202 selects the compressed video data S200a, while where the input video data VIN is to be edited, it selects the compressed video data S204.

The error correction code addition circuit 206 performs Reed-Solomon coding with respect to the compressed video data S202 under the control of the control circuit 210 via a control signal C206 and further performs convolution coding and outputs the result as the transmission signal S206 to the digital modulation circuit 208.

The digital modulation circuit 208 digitally modulates the transmission signal S206 by a modulation method in accordance with the transmission speed thereof under the control of the control circuit 210 via a control signal C208 and outputs the same as the modulated signal S208 of the intermediate frequency band to the transmitting apparatus 14. As this digital modulation circuit, for example, a quadrature phase shift keying (PSK) circuit is used. Also, as the transmission speed, a rate of 20 Mbps or 40 Mbps is selected.

The transmitting apparatus 14 converts the modulated signal S208 to a transmission signal suited to the satellite communication line and transmits the same onto the satellite communication line. The signal transmitted from the transmitting apparatus 14 is relayed by a communication satellite 115 and becomes a reception signal from the video data transmitting apparatus 20.

The receiving apparatus 16 of the video data receiving apparatus 22 receives the transmission signal from the satellite communication line and outputs the same as the reception signal S124 to the digital demodulation circuit 220.

The digital demodulation circuit 220 digitally demodulates the reception signal S124 by a method in accordance with the transmission speed thereof under the control of the control circuit 230 via a control signal C220 and outputs the result as the demodulated signal S220 to the error correction circuit 222. Note that, it is also possible if the transmission speed of the transmission signal is identified by the digital demodulation circuit 220 per se not under the control of the control circuit 230, and the demodulation is carried out in accordance with the identified transmission speed.

The error compression circuit 222 performs error correction with respect to the demodulated signal S220 under the control of the control circuit 230 via a control signal C222, decodes the same by a method corresponding to the error correction code addition circuit 206 of the video data transmitting apparatus 20, and outputs the resultant data as the compressed video data S222 to the data selection circuit 226 and the data storage device 224.

The data storage device 224 records the compressed video data S222 under the control of the control circuit 230 via a control signal C224, reads the recorded compressed video data at a real time speed, and outputs the same as the compressed video data S224 to the data selection circuit 226.

The data selection circuit 226 selects either of the compressed video data S222 or S224 under the control of the control circuit 230 via a control signal C226 and outputs the same as the compressed video data S226 to the decoding device 228.

The decoding device 228 performs decompression by a method in accordance with the compression rate of the compressed video data S226 and supplies the output video data VOUT corresponding to the original input video data VIN to an outside apparatus.

Below, the operation of the video data transmitting apparatus 20 and the video data receiving apparatus 22 will be explained.

The video data transmitting apparatus 20 is switched in operation in accordance with the purpose and object of the input video data VIN.

An explanation will be made below of a transmission operation in a case where a high quality video is required after decoding at the video data receiving apparatus 22, for example, where the video data after decoding is to be edited. This is defined as the first transmission mode.

In this first transmission mode, data indicating the first transmission mode is input from a transmission mode input terminal 211 of the control circuit 210. When the data indicating the first transmission mode is input, the control circuit 210 supplies control data indicating that the first mode has been selected to the high efficient coding device 200, the data storage device 204, the data selection circuit 202, the error correction code addition circuit 208, the mode data multiplexing circuit 207, and the digital modulation circuit 208. By the supply of this control data, the high efficient coding device 200, the data storage device 204, the data selection circuit 202, the error correction code addition circuit 208, the mode data multiplexing circuit 207, and the digital modulation circuit 208 each operate in the first transmission mode.

The input video data VIN input from an input end IN1 is compressed and coded by the high efficient coding device 200 at a relatively low compression rate so that the amount of the compressed video data becomes larger than a predetermined value. The video data S200b compressed at this high efficient coding device 200 is once recorded by the data storage device 204. Then, this data storage device 204 reproduces and outputs the once recorded video data at a transmission rate of the satellite communication line, for example, 40 Mbps, and supplies the same as the video data S204 to the selection circuit 202. This data storage device 204 is constituted so that it can simultaneously execute a recording operation and reproduction operation having different rates from each other. Further, it is also possible to adopt a configuration wherein all of the input video data to be transmitted this time are once recorded and then reproduced and output at for example 40 Mbps. In this case, the switching of the recording operation and reproduction operation is carried out under the control of the control circuit 210. The selection circuit 202 selects the video data S204 supplied from the data storage device 204 and supplies the same as the video data S202 to the succeeding error correction code addition circuit 206. The error correction code addition circuit 206, the digital modulation circuit 208, the frequency conversion circuit 106, and the power amplification circuit 108 apply the above processing and supply the processed video data to the transmission antenna 110.

Next, the operation of the video data transmitting apparatus 20 in the case where it is required that the input video data VIN, such as video data of live sports coverage, be transmitted to the video data receiving apparatus 22 in real time, will be explained below. This is defined as the second transmission mode.

In this second transmission mode, data indicating the second transmission mode is input from the transmission mode input terminal 211 of the control circuit 210. When data indicating the second transmission mode is input, the control circuit 210 supplies control data indicating that the second mode is selected to the high efficient coding device 200, the data storage device 204, the data selection circuit 202, the error correction code addition circuit 208, the mode data multiplexing circuit 207, and the digital modulation circuit 208. By the supply of this control data, the high efficient coding device 200, the data storage device 204, the data selection circuit 202, the error correction code addition circuit 208, the mode data multiplexing circuit 207 and the digital modulation circuit 208 operate in the second transmission mode.

The input video data VIN input from the input end IN1 is compressed and coded by the high efficient coding device 200 at a compression rate so that the amount of the compressed video data becomes smaller than the above predetermined value. The data rate after compression becomes for example 40 Mbps. The video data compressed at this high efficient coding device 200 is not stored in the data storage device 204, but is directly supplied to the selection circuit 202 as the video data S200a. The selection circuit 202 selects the video data S200a supplied from the high efficient coding device 200 and supplies the same as the video data S202 to the succeeding error correction code addition circuit 206. The error correction code addition circuit 206, the digital modulation circuit 208, the frequency conversion circuit 106, and the power amplification circuit 108 apply the above processing and supply the processed video data to the transmission antenna 110.

Next, an explanation will be made of the transmission operation in a case where the raw footage of news etc. preliminarily filmed and recorded in a camcorder or other recording and reproducing apparatus should be transmitted to the video data receiving apparatus 22 in a shorter time than real time. This will be defined as a third transmission mode.

In this third transmission mode, data indicating the third transmission mode is input from the transmission mode input terminal 211 of the control circuit 210. When the data indicating the third transmission mode is input, the control circuit 210 supplies control data indicating that the third mode is selected to the high efficient coding device 200, the data storage device 204, the data selection circuit 202, the error correction code addition circuit 208, the mode data multiplexing circuit 207, and the digital modulation circuit 208. By the supply of this control data, the high efficient coding device 200, the data storage device 204, the data selection circuit 202, the error correction code addition circuit 208, and the digital modulation circuit 208 operate in the third transmission mode, respectively.

The input video data VIN such as raw news footage input from the input end IN1 is compressed and coded at a high compression rate so that the amount of the compressed video data becomes further smaller than that in the second mode. The video data S200b compressed at this high efficient coding device 200 is recorded once in the data storage device 204. Then, this data storage device 204 reproduces and outputs the once recorded video data at a transmission rate of the satellite communication line, for example, 40 Mbps, and supplies the same as the video data S204 to the selection circuit 202. This data storage device 204 operates so as to once record all of the input video data after compression and now to be transmitted and then reproduce and output the same at for example 40 Mbps. In this case, the switching between the recording operation and the reproduction operation is carried out under the control of the control circuit 210. The selection circuit 202 selects the video data S204 supplied from the data storage device 204 and supplies the same as the video data S202 to the succeeding error correction code addition circuit 206. The error correction code addition circuit 206, the digital modulation circuit 208, the frequency conversion circuit 106, and the power amplification circuit 108 apply the above processing and supply the processed video data to the transmission antenna 110.

Note that, the data indicating the above transmission mode is added to the head of the video data at the mode data multiplexing circuit 207 and then transmitted to the video data receiving apparatus 22. Alternatively, as another method, the control circuit 210 transmits the data indicating the transmission mode to the video data receiving apparatus 22 by a transmission line other than the above satellite communication line. Alternatively, as still another method, it is also possible for an operator on the video data transmitting apparatus 20 side to manually inform the same to the operator of the video data receiving apparatus 22 side by a telephone, FAX, etc. Further, when the transmission of the video data is completed, flag data indicating that the transmission of the video data is completed is added to the end of the video data at the mode data multiplexing circuit 207 and transmitted to the video data receiving apparatus 22.

Next, an explanation will be made of the operation of the video data receiving apparatus 22. The video data receiving apparatus 22 is switched in its reception mode in accordance with the transmission mode of the video data transmitting apparatus 20. The switching of this reception mode is carried out by having the control circuit 230 generate a control signal based on the data indicating the transmission mode sent together with the video data via the satellite communication line, or as another method, data indicating the transmission mode sent via the transmission line other than the satellite communication line, or, as still another method, data indicating the transmission mode manually input to the control circuit 230, and supplies this control signal to the digital demodulation circuit 220, the error correction circuit 222, the data storage device 224, the data selection circuit 226, and the decoding device 228. Note that, where the data indicating the transmission mode is sent together with the video data via the satellite communication line, the data indicating the transmission mode is separated at a mode data separation circuit 221 and supplied to the control circuit 230 via a control line C221.

First, where the video data transmitted by the first transmission mode is received, the control circuit 230 detects that the mode is the first transmission mode and supplies the control signal indicating the first reception mode corresponding to this first transmission mode to the digital demodulation circuit 220, the error correction circuit 222, the data storage device 224, the data selection circuit 226, and the decoding device 228.

Next, the video data received at the reception antenna 120 is subjected to the above processing at the low noise amplification circuit 122, the frequency conversion circuit 124, the digital demodulation circuit 220, and the error correction circuit 222.

Then, the video data S222 subjected to the error correction at the error correction circuit 222 is recorded in the data storage device 224 at a rate of 40 Mbps. The video data once recorded in the data storage device 224 is reproduced and output from the data storage device 224 at a rate for restoring the real time video signal, which rate is larger than 40 Mbps, and supplied as the video data S224 to the data selection circuit 226. The data selection circuit 226 selects this video data S224 and supplies the same as the video signal S226 to the succeeding decoding device 228. The decoding device 228 decompresses the video data S226 supplied from the data selection circuit 226 in accordance with the compression rate of the video data S226 and outputs the same as the output video data VOUT corresponding to the original input video data VIN. In this case, the switching between the recording operation and reproduction operation of the data storage device 224 is carried out under the control of the control circuit 230. For example, the control circuit 230 switches the recording operation of the data storage device 224 to the reproduction operation when detecting that the flag data indicating that the transmission of the video data is completed is separated at the mode data separation circuit 221 and supplied to the control circuit 230. In this way, the input video data VIN is output as the output video data VOUT from the output end of the video data receiving apparatus 22 in a high quality state.

Next, where video data transmitted by the second transmission mode is received, the control circuit 230 detects that the mode is the second transmission mode and supplies a control signal indicating the second reception mode corresponding to this second transmission mode to the digital demodulation circuit 220, the error correction circuit 222, the data storage device 224, the data selection circuit 226, and the decoding device 228.

Next, the video data received at the reception antenna 120 is subjected to the processing at the low noise amplification circuit 122, the frequency conversion circuit 124, the digital demodulation circuit 220, and the error correction circuit 222.

Then, the video data S222 subjected to the error correction at the error correction circuit 222 is directly supplied to the data selection circuit 226 at a rate of 40 Mbps. The data selection circuit 226 selects this video data S222 and supplies the same as the video signal S226 to the succeeding decoding device 228. The decoding device 228 decompresses the video data S226 supplied from the data selection circuit 226 in accordance with the compression rate of the video data S226 and outputs the same as the output video data VOUT corresponding to the original input video data VIN. In this way, the input video data VIN is output as the output video data VOUT from the output end of the video data receiving apparatus 22 in real time.

Further, where video data transmitted by the third transmission mode is received, the control circuit 230 detects that the mode is the third transmission mode and supplies a control signal indicating the first reception mode corresponding to this third transmission mode to the digital demodulation circuit 220, the error correction circuit 222, the data storage device 224, the data selection circuit 226, and the decoding device 228.

Next, the video data received at the reception antenna 120 is subjected to the processing at the low noise amplification circuit 122, the frequency conversion circuit 124, the digital demodulation circuit 220, and the error correction circuit 222.

Then, the video data S222 subjected to the error correction at the error correction circuit 222 is recorded in the data storage device 224 at a rate of 40 Mbps. Then, the video data once recorded in this data storage device 224 is reproduced and output from the data storage device 224 at a rate for restoring the real time video signal, which rate is smaller than 40 Mbps, and supplied as the video data S224 to the data selection circuit 226. The data selection circuit 226 selects this video data S224 and supplies the same as the video signal S226 to the succeeding decoding device 228. The decoding device 228 decompresses the video data S226 supplied from the data selection circuit 226 in accordance with the compression rate of the video data S226 and outputs the same as the output video data VOUT corresponding to the original input video data VIN. In this case, the switching between the recording operation and the reproduction operation of the data storage device 224 is carried out under the control of the control circuit 230. For example, the control circuit 230 switches the recording operation of the data storage device 224 to the reproduction operation when detecting that the flag data indicating that the transmission of the video data is completed is separated at the mode data separation circuit 221 and supplied to the control circuit 230. Alternatively, it is also possible to use as the data storage device 204 an apparatus having a structure where a recording operation and reproduction operation having different rates from each other can be simultaneously executed. In this way, the input video data VIN can be transmitted from the video data transmitting apparatus 20 to the video data receiving apparatus 22 in a time shorter than real time.

Note that, the transmission rate from the video data transmitting apparatus 20 to the video data receiving apparatus 22 is not limited to 40 Mbps and can be 20 Mbps too. Further, it is also possible to selectively use these rates.

As mentioned above, according to the video data transmitting and receiving system according to the present invention using the video data transmitting apparatus 20 and the video data receiving apparatus 22, where video data is transmitted at a real time speed, by adequately setting the parts of the video data transmitting apparatus 20, it becomes possible to transmit the video data exactly by a time difference of the sum of an internal delay of the video data transmitting apparatus 20 and the video data receiving apparatus 22 and the transmission delay on the communication line.

Further, where the video data is transmitted at a non-real time speed, by once recording the compressed video data in the data storage device in order, reproducing the recorded data at a non-real time transmission speed, and generating a transmission signal, it is possible to transmit video data coded at any compression rate at a transmission speed suited to the transmission capacity of the transmission path such as a satellite communication line to for example the video data receiving apparatus 22 side.

Further, in the video data receiving apparatus 22, the demodulated reception signal is once recorded in the data storage device, then is reproduced at a rate different from that at the recording, whereby it is possible to obtain the output video data VOUT at the same speed as that of the original input video data. As a result, non-real time speed transmission such as high speed transmission becomes possible.

Further, where for example the video data transmitting and receiving system according to the present invention is used for the transmission of video data for the broadcast business, video data of raw news footage which has been already recorded and must be edited at the broadcasting station in a hurry can be transmitted in a relatively short time. Accordingly, by using these functions by switching in accordance with the purpose and object of the input video data VIN, it is possible to greatly facilitate the production of news programs, which make extensive use of combinations of live pictures and edited pictures.

Further, if the video data transmitting and receiving system according to the present invention is used for transmission via a relay unit of a communication satellite, the video data can be transmitted at a transmission speed matched with the frequency band width of the relay unit which can be used at the time of performing the transmission, so the frequency band useable for transmission can be efficiently utilized.

Further, according to the video data transmitting and receiving system of the present invention, transmission is possible giving a higher quality of the decoded image for raw videos which would probably deteriorate in quality due to editing in comparison with the quality of the decoded image of a live picture for which the editing is not performed. As a result, the quality of the live picture and the edited video at the broadcast stage can be made uniform.

Note that, the video data transmitting and receiving system according to the present invention can be used for the transmission of video data using ground wave communication lines or cable transmission lines in addition to satellite communication lines.

Further, the video data transmitting and receiving system according to the present invention can be used for the general transmission of data in which the compression and coding are carried out other than the transmission of video data by changing the high efficient coding device 102 and the decoding device 228.

Further, the elements of the video data transmitting and receiving system of the present invention may be constituted either by hardware or by software so long as they are interchangeable.

The video data transmitting apparatus, video data receiving apparatus, and video data transmitting and receiving system of the present invention can be of configurations other than those shown in the embodiments as explained for example by the above modifications.

As mentioned above, the video data transmitting apparatus, video data receiving apparatus, and video data transmitting and receiving system of the present invention can greatly shorten the time required for the transmission of for example raw news footage of great urgency.

Further, according to the video data transmitting apparatus, video data receiving apparatus, and video data transmitting and receiving system of the present invention, the user can transmit a video signal with a preferred transmission method in accordance with the purpose and object of the video signal.

I claim:

1. A video data transmitting apparatus for transmitting a video signal over a transmission channel at the transmission channel rate, comprising:

a control means for outputting a control signal indicating a transmission mode of a video signal;

a compression means for receiving as its input the video signal and compressing an amount of information of the video signal at a compression rate in accordance with the transmission mode indicated by the control signal;

a recording and reproducing means for selectively recording the compressed video signal at a recording rate, said recording rate being different from the transmission channel rate, and for reproducing the recorded video signal at the transmission channel rate, the recorded video signal being reproduced at the transmission channel rate regardless of the recording rate, said recording and reproducing means being operable to perform the recording and reproducing operations simultaneously;

a selection means for selecting an output video signal of the compression means or the output video signal of the recording and reproducing means in accordance with the transmission mode indicated by the control signal and outputting the selected output video signal; and a transmission means for modulating the output video signal supplied from the selection means and transmitting the resultant signal.

2. A video data transmitting apparatus according to claim 1, wherein said transmission mode is selected from among a first mode for a high quality transmission, a second mode for a real time transmission, and a third mode for a short time transmission.

3. A video data transmitting apparatus according to claim 2, wherein said compression means compresses the amount of information of said video signal at a first compression rate in accordance with the transmission rate of said transmission means when said second mode is selected as said transmission mode, compresses the amount of information of said video signal at a second compression rate lower than said first compression rate when said first mode is selected as said transmission mode, and compresses the amount of information of said video signal at a third compression rate higher than said first compression rate when said third mode is selected as said transmission mode.

4. A video data transmitting apparatus according to claim 3, wherein said selection means selects the output video signal of said compression means when said second mode is selected as said transmission mode and selects the output video signal of said recording and reproducing means when said first mode or said third mode is selected as said transmission mode.

5. A video data transmitting apparatus according to claim 1, wherein said transmission means has an addition means for adding data indicating said transmission mode to said output video signal supplied from said selection means.

6. A video data transmitting apparatus according to claim 5, wherein said transmission means has an error correction code addition circuit which adds the error correction code to said output video signal supplied from said selection means.

7. A video data receiving apparatus for receiving a video signal over a transmission channel at the transmission channel rate, comprising:

a reception means for receiving a compressed digital video signal including a transmission mode;

a detection means for detecting the transmission mode of the signal received at the reception means;

a recording and reproducing means for selectively recording the compressed video signal at the transmission channel rate and for reproducing the recorded video signal at a reproduction rate in accordance with the detected transmission mode, wherein the reproduction rate is different from the transmission channel rate and the recorded video signal is reproduced at the reproduction rate regardless of the transmission channel rate, said recording and reproducing means being operable to perform the recording and reproducing operations simultaneously;

a selection means for selecting the output signal of the reception means or the output signal of the recording and reproducing means in accordance with the detected transmission mode and outputting the selected signal; and a decompression means for decompressing the signal output from the selection means.

8. A video data receiving apparatus according to claim 7, wherein said detection means has an extraction means for extracting the data indicating said transmission mode from among signals received by said reception means.

9. A video data receiving apparatus according to claim 8, wherein said transmission mode is selected from among a first mode for a high quality transmission, a second mode for a real time transmission, and a third mode for a short time transmission; and said selection means selects the output signal of said reception means when said second mode is detected as said transmission mode and selects the output signal of said recording and reproducing means when said first mode or said third mode is detected as said transmission mode.

10. A video data transmitting and receiving system for transmitting and/or receiving a video signal over a transmission channel at the transmission channel rate, comprising:

a control means for outputting a control signal indicating a transmission mode of a video signal;

a compression means for receiving as its input the video signal and compressing the amount of information of the video signal at a compression rate in accordance with the transmission mode indicated by the control signal;

a first recording and reproducing means for selectively recording the compressed video signal at a recording rate, said recording rate being different from the transmission channel rate and for reproducing the recorded video signal at the transmission channel rate, the recorded video signal being reproduced at the transmission channel rate regardless of the recording rate, said first recording and reproducing means being operable to perform the recording and reproducing operations simultaneously;

a first selection means for selecting an output video signal of the compression means or the output video signal of the first recording and reproducing means in accordance with the transmission mode indicated by the control signal and outputting the selected output video signal;

a transmission means for transmitting the output video signal supplied from the selection means to the transmission channel;

a reception means for receiving the transmitted signal from the transmission channel;

a detection means for detecting the transmission mode of the signal received at the reception means;

a second recording and reproducing means for selectively recording the signal received by the reception means in accordance with the transmission mode detected by the detection means and reproducing the recorded video signal at a rate in accordance with the detected transmission mode, said second recording and reproducing means being operable to perform the recording and reproducing operations simultaneously;

a second selection means for selecting the output signal of the reception means or the output signal of the second recording and reproducing means in accordance with the detected transmission mode and outputting the selected signal; and a decompression means for decompressing the signal output from the second selection means.

* * * * *